(12) United States Patent
Plickys

(10) Patent No.: US 10,301,029 B2
(45) Date of Patent: May 28, 2019

(54) PROPELLER ASSEMBLY HAVING A BRUSH BLOCK ASSEMBLY

(71) Applicant: HAMILTON SUNDSTRAND CORPORATION, Charlotte, NC (US)

(72) Inventor: Mark R. Plickys, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 419 days.

(21) Appl. No.: 15/156,664

(22) Filed: May 17, 2016

(65) Prior Publication Data
US 2017/0334567 A1 Nov. 23, 2017

(51) Int. Cl.
| | |
|---|---|
| *B64D 15/12* | (2006.01) |
| *B64C 11/14* | (2006.01) |
| *B64C 11/20* | (2006.01) |
| *H01R 39/08* | (2006.01) |
| *B64C 11/02* | (2006.01) |
| *H01R 39/10* | (2006.01) |
| *H01R 39/58* | (2006.01) |

(52) U.S. Cl.
CPC ............ *B64D 15/12* (2013.01); *B64C 11/02* (2013.01); *B64C 11/14* (2013.01); *B64C 11/20* (2013.01); *H01R 39/08* (2013.01); *H01R 39/10* (2013.01); *H01R 39/58* (2013.01); *B64D 2221/00* (2013.01)

(58) Field of Classification Search
CPC ...................................................... H01R 39/58
See application file for complete search history.

(56) References Cited

U.S. PATENT DOCUMENTS

| 1,253,265 | A | | 1/1918 | McKeown |
|---|---|---|---|---|
| 4,136,295 | A | * | 1/1979 | Sweet .................. B64D 15/12 244/134 D |
| 4,333,095 | A | | 6/1982 | Silva |
| 4,344,072 | A | | 8/1982 | Harper, Jr. |
| 4,536,670 | A | | 8/1985 | Mayer |
| 5,479,060 | A | | 12/1995 | Giamati et al. |

(Continued)

FOREIGN PATENT DOCUMENTS

| DE | 2804547 A1 | 8/1979 |
|---|---|---|
| DE | 102010031415 A1 | 1/2012 |

(Continued)

OTHER PUBLICATIONS

European Search Report for European Application No. 17170665.8 dated Sep. 22, 2017; 10 pages.

*Primary Examiner* — Justin D Seabe
*Assistant Examiner* — Juan G Flores
(74) *Attorney, Agent, or Firm* — Cantor Colburn LLP

(57) ABSTRACT

A brush wear indicating arrangement is provided. The brush wear indicating arrangement includes an insert, a first electrically conductive brush, and a wear indicator. The insert is disposed within a brush block housing and defines a first aperture. The first electrically conductive brush is movably engaged within the first aperture. The electrically conductive brush is configured to move outward from the first aperture as a wear surface of the first electrically conductive brush wears. The wear indicator is coupled to the first electrically conductive brush. The wear indicator is configured to extend beyond a first insert face of the insert as wear condition of the wear surface of the first electrically conductive brush exceeds a wear threshold.

15 Claims, 3 Drawing Sheets

(56) References Cited

U.S. PATENT DOCUMENTS 5,509,625 A     4/1996   Oullette et al.
6,137,082 A * 10/2000   Pruden .................... B64C 11/00
                                                                                   219/201

FOREIGN PATENT DOCUMENTS

WO          9904460 A1    1/1999
WO          9961314 A2   12/1999

* cited by examiner

PROPELLER ASSEMBLY HAVING A BRUSH BLOCK ASSEMBLY

BACKGROUND

Rotor or propeller equipped craft are provided with deicing components that aid in the removal of the formation of ice on the rotor or propeller. Typically the deicing components include electrical deicing elements disposed on the rotor or the propeller that receive electrical power. To transfer the electrical power from a nonrotating component to the rotating rotor or propeller a brush block assembly may be provided to transfer power to a metallic slip ring on a rotating side of the rotor or propeller. Components of the brush lock assembly may be subject to wear over time.

BRIEF DESCRIPTION

According to an embodiment of the present disclosure, a propeller assembly is provided. The propeller assembly includes a propeller hub, a plurality of slip rings, and a brush block assembly. The propeller hub is configured to rotatably support a propeller blade that has a heating element. The plurality of slip rings are electrically connected to the heating element. The plurality of slip rings are disposed on a spinner bulkhead that is attached to the propeller hub. The brush block assembly is configured to engage the plurality of slip rings to transfer electric power from a power source to the heating element. The brush block assembly includes a brush block housing, a first electrically conductive brush, and a first wear indicator. The first electrically conductive brush extends from the brush block housing and is configured to engage a slip ring of the plurality of slip rings. The first wear indicator is connected to the first electrically conductive brush and extends towards a front wall of the brush block housing.

According to another embodiment of the present disclosure, a brush wear indicating arrangement is provided. The brush wear indicating arrangement includes an insert, a first electrically conductive brush, and a wear indicator. The insert is disposed within a brush block housing and defines a first aperture. The first electrically conductive brush is movably engaged within the first aperture. The electrically conductive brush is configured to move outward from the first aperture as a wear surface of the first electrically conductive brush wears. The wear indicator is coupled to the first electrically conductive brush. The wear indicator is configured to extend beyond a first insert face of the insert as wear condition of the wear surface of the first electrically conductive brush exceeds a wear threshold.

According to yet another embodiment of the present disclosure, a method of indicating a wear condition of an electrically conductive brush is provided. The method includes providing a brush block assembly having a wear indicator arrangement. The wear indicator arrangement includes an electrically conductive brush having a wear indicator that is disposed within a brush block housing. The electrically conductive brush has a wear surface that engages a slip ring. The method further includes exposing an end of the wear indicator as the wear surface wears beyond a selected dimension of the electrically conductive brush.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
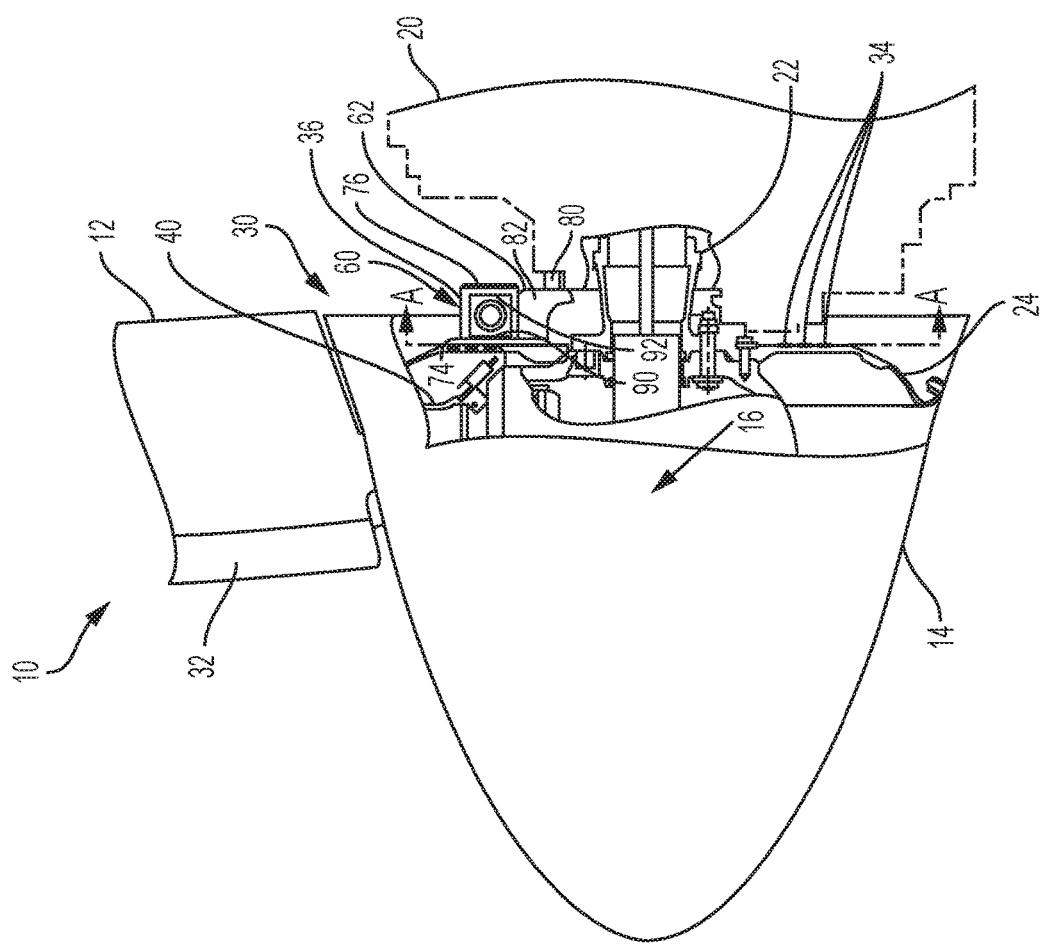
FIG. 1 is a partial perspective view of a propeller assembly.

Referring to FIG. 1, a propeller assembly 10 for an aircraft is shown. The propeller assembly 10 includes a plurality of propeller blades 12 (for clarity, only one is illustrated) arranged about a propeller spinner 14. The plurality of propeller blades 12 are rotationally supported by a propeller hub 16. The propeller hub 16 is operably connected to a reduction gearbox 20 through a propeller shaft 22 that is connected to an engine assembly. The reduction gearbox 20 translates a rotational speed of the engine assembly into a selected propeller speed. The propeller shaft 22 extends through a spinner bulkhead 24 that supports an aft end of the propeller spinner 14. The spinner bulkhead 24 is attached to an aft surface of the propeller hub 16.

The reduction gearbox 20 and the engine assembly may be disposed within a nacelle. The propeller spinner 14 may be spaced apart from the nacelle. The propeller shaft 22 may extend between the propeller spinner 14 and the nacelle. The nacelle may be provided with a removable access panel disposed proximate an edge of the nacelle and an edge of the propeller spinner 14.

The propeller assembly 10 includes a deicing system 30. The deicing system 30 is configured to deice all of the propeller blades of the plurality of propeller blades 12. The deicing system 30 includes a heating element 32, a plurality of slip rings 34, and a brush block assembly 36.

A heating element 32 is disposed on a propeller blade of the plurality of propeller blades 12. In at least one embodiment, the heating element 32 is disposed on a leading edge of a propeller blade of the plurality of propeller blades 12. The heating element 32 may be configured as a resistive heater, an inductive heater, or the like. The heating element 32 may be embedded within a propeller blade of the plurality of propeller blades 12. Electrical leads 40 may extend from the heating element 32. The electrical leads 40 extends towards the spinner bulkhead 24. In at least one embodiment, the electrical leads 40 interfaces with the spinner bulkhead 24.

Figure 2:
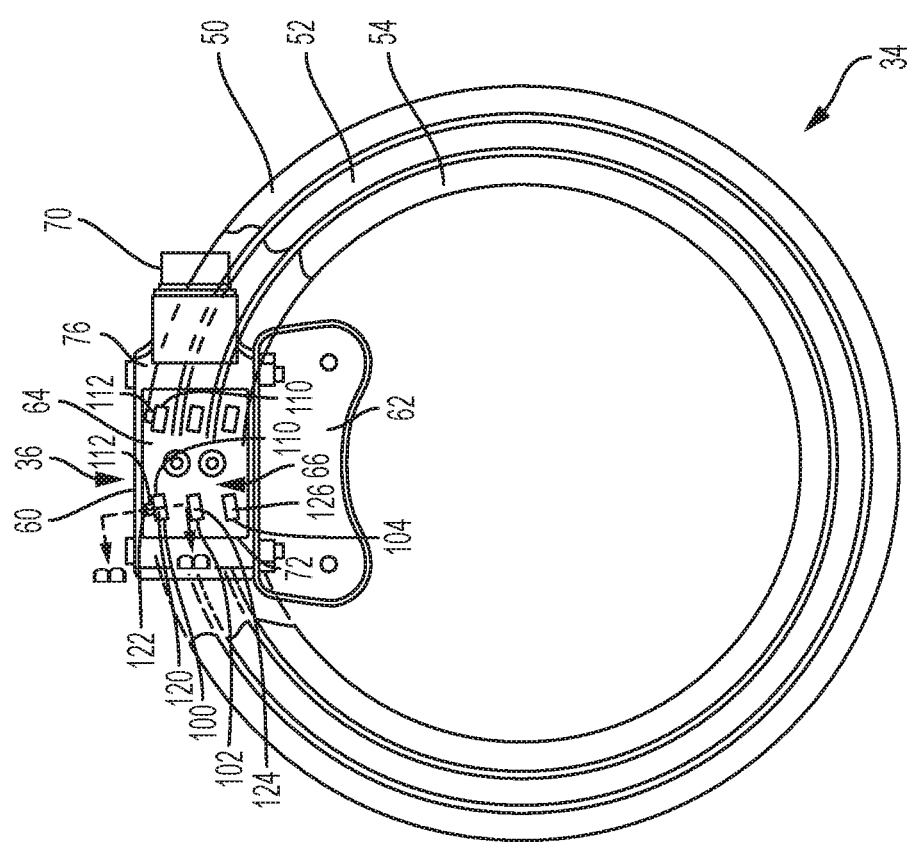
FIG. 2 is a partial perspective view of the propeller assembly along section line A-A of FIG. 1.

Referring to FIGS. 1 and 2, a plurality of slip rings 34 are disposed on the spinner bulkhead 24. The plurality of slip rings 34 are electrically connected to the heating element 32 through the electrical leads 40. The illustrated plurality of slip rings 34 include a plurality of electrically conductive slip rings. In at least one embodiment, the plurality of slip rings 34 include a first slip ring 50, a second slip ring 52, and a third slip ring 54.

The first slip ring 50 may be electrically connected to each heating element 32 disposed on a propeller blade of the plurality of propeller blades 12. The first slip ring 50 may operate as a return or ground for each heating element 32.

The second slip ring 52 is disposed concentrically with the first slip ring 50. The second slip ring 52 is disposed or nested within the first slip ring 50. The second slip ring 52 may be electrically connected to a first subset of propeller blades of the plurality of propeller blades 12. For example, the second slip ring 52 may be electrically connected to the odd numbered propeller blades of the plurality of propeller blades 12.

The third slip ring 54 is disposed concentrically with the first slip ring 50 and the second slip ring 52. The third slip ring 54 is disposed or nested within the second slip ring 52. The third slip ring 54 may be electrically connected to a second subset of propeller blades of the plurality of propeller blades 12. For example, third slip ring 54 may be electrically connected to the even-numbered propeller blades of the plurality of propeller blades 12.

The brush block assembly 36 is disposed between the reduction gearbox 20 and the spinner bulkhead 24. The brush block assembly 36 is configured to engage the plurality of slip rings 34. The brush block assembly 36 is configured to transfer of electric power from a power source to the heating element 32 through the plurality of slip rings 34. The brush block assembly 36 is provided with a wear indicating arrangement configured to provide a visual indicator as to whether a component of the brush block assembly 36 is to be replaced. The brush block assembly 36 includes a brush block housing 60, a mounting bracket 62, an insert 64, and an electrically conductive brush assembly 66.

The brush block housing 60 includes an electrical connector 70 that is electrically connected to the power source. The brush block housing 60 defines an opening 72. The opening 72 is configured to receive the insert 64 and the electrically conductive brush assembly 66. The opening 72 extends from a front wall 74 of the brush block housing 60 towards a back wall 76 of the brush block housing 60. The opening 72 does not extend completely through the back wall 76 of the brush block housing 60.

The brush block housing 60 is connected to the mounting bracket 62. The mounting bracket 62 is disposed on the reduction gearbox 20. The mounting bracket 62 includes a first mounting portion 80 and a second mounting portion 82. The first mounting portion 80 is configured to engage the reduction gearbox 20. The second mounting portion 82 extends from the first mounting portion 80 towards the spinner bulkhead 24. The second mounting portion 82 engages the brush block housing 60.

The insert 64 is received within the opening 72 of the brush block housing 60. The insert 64 is secured to the brush block housing 60 by at least one retainer bolt that extends through the back wall 76 and extends into the insert 64. The insert 64 is made of a low coefficient of friction material such as Teflon, PTFE, PEEK, or the like.

The insert 64 includes a first insert face 90 and a second insert face 92 disposed opposite the first insert face 90. The first insert face 90 is disposed proximate the front wall 74 of the brush block housing 60. The second insert face 92 is disposed proximate the back wall 76 of the brush block housing 60. The insert 64 defines a first aperture 100, a second aperture 102, and a third aperture 104. In at least one embodiment, the insert 64 defines a first pair of apertures, a second pair of apertures, and a third pair of apertures. The first pair of apertures are disposed adjacent to each other and have a substantially similar configuration as the first aperture 100. The second pair of apertures are disposed adjacent to each other and are disposed below or spaced apart from the first pair of apertures and have a substantially similar configuration as the second aperture 102. The third pair of apertures are disposed adjacent to each other and are disposed below or spaced apart from the second pair of apertures and have a substantially similar configuration as the third aperture 104 that has a substantially similar configuration as the second aperture 102.

The first aperture 100 extends from the first insert face 90 towards the second insert face 92. The first aperture 100 includes a brush opening 110 and an indicator opening 112. The brush opening 110 has a brush opening width. The indicator opening 112 extends from the brush opening 110. The indicator opening 112 has an indicator opening width. The indicator opening width is less than the brush opening width.

The second aperture 102 is spaced apart from or disposed below the first aperture 100. The second aperture 102 extends from the first insert face 90 towards the second insert face 92. The second aperture 102 includes a second brush opening. The second brush opening of the second aperture 102 has a configuration substantially similar to the brush opening 110 of the first aperture 100. In at least one embodiment, the second aperture 102 further includes an indicator opening extending from the second brush opening.

The third aperture 104 spaced apart from or disposed below the second aperture 102. The third aperture 104 extends from the first insert face 90 towards the second insert face 92. The third aperture 104 also includes a third brush opening. The third brush opening of the third aperture 104 has a configuration substantially similar to the second brush opening of the second aperture 102. In at least one embodiment, the third aperture 104 further includes an indicator opening extending from the third brush opening.

Referring to FIGS. 1-4, the plurality of slip rings 34 rotate relative to the electrically conductive brush assembly 66. A wear surface of the electrically conductive brush assembly 66 is subject to wear over time due to their engagement with the rotating plurality of slip rings 34. The electrically conductive brush assembly 66 includes a first electrically conductive brush 120, a first wear indicator 122, a second electrically conductive brush 124, and a third electrically conductive brush 126.

The first electrically conductive brush 120, the second electrically conductive brush 124, and the third electrically conductive brush 126 are made of carbon or the like. In at least one embodiment, the electrically conductive brush assembly 66 includes a first pair of electrically conductive brushes and a first pair of where indicators slidably received within the first pair of apertures. The electrically conductive brush assembly 66 further includes a second pair of electrically conductive brushes slidably received within the second pair of apertures. Electrically conductive brush assembly 66 further includes a third pair of electrically conductive brushes slidably received within the third pair of apertures.

The first electrically conductive brush 120 is slidably received within or movably engaged with the first aperture 100. The first electrically conductive brush 120 extends from the insert 64 disposed in the brush block housing 60. The first electrically conductive brush 120 includes a brush body 130 that extends between a first brush end 132 and a second brush end 134. The brush body 130 slidably engages an interior surface of the first aperture 100. The first brush end 132 is configured to engage the first slip ring 50 of the plurality of slip rings 34. The second brush end 134 is disposed proximate the back wall 76 of the brush block housing 60 and is disposed proximate the second insert face 92 of the insert 64.

The first wear indicator 122 is disposed on the first electrically conductive brush 120. In at least one embodiment, the first wear indicator 122 is integrally formed with the first electrically conductive brush 120 such that the first electrically conductive brush 120 is provided with the first wear indicator 122. The first wear indicator 122 may be made of a soft plastic. The first wear indicator 122 includes a base 140 and a wear arm 142.

The base 140 is configured as a ring having an opening 144 extending there through. The base 140 is disposed about the second brush end 134. An electrical wire extends from the second brush end 134 through the opening 144 to a terminal stud disposed on the brush block housing 60.

The wear arm 142 extends from the base 140 towards the first brush end 132. The wear arm 142 is disposed substantially parallel to the brush body 130. In at least one embodiment, the wear arm 142 and the base 140 slidably engage the interior surface of the first aperture 100.

A first biasing member 146 is received within the first aperture 100. The first biasing member 146 engages the back wall 76 of the brush block housing 60 and engages at least one of the base 140 of the first wear indicator 122 and the second brush end 134. The first biasing member 146 biases the first brush and 132 of the first electrically conductive brush 120 towards engagement with the first slip ring 50 of the plurality of slip rings 34. As a wear surface of the first electrically conductive brush 120 wears, the first biasing member 146 moves the first electrically conductive brush 120 outward from the brush block housing 60 towards the plurality of slips rings 34.

Figure 3:
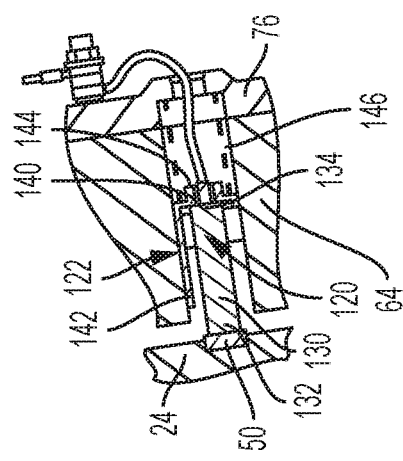
FIG. 3 is a partial perspective view of a brush block assembly having a brush provided with a wear indicator in a first position along section line B-B of FIG. 2.
Figure 4:
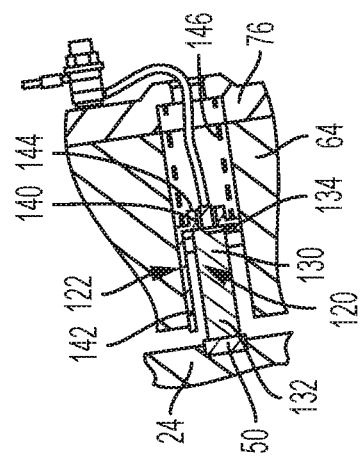
FIG. 4 is a partial perspective view of the brush block assembly having the brush provided with the wear indicator in a second position along section line B-B of FIG. 2.

The first wear indicator 122 installed on the first electrically conductive brush 120 provides a visible means of determining if the first electrically conductive brush 120 is worn beyond a predetermined wear condition. The predetermined wear condition may be a predetermined wear amount or a selected dimension of the first electrically conductive brush 120 that wears as the wear surface wears. As shown in FIG. 3, the wear arm 142 of the first wear indicator 122 do not extend beyond the first insert face 90 of the insert 64 making the wear arm 142 not visible when the removable access panel disposed proximate the edge of the nacelle and the edge of the propeller spinner 14 is removed. As the first electrically conductive brush 120 wears during operation, the wear arm 142 of the first wear indicator 122 moves axially along with the first electrically conductive brush 120 by the first biasing member 146. As shown in FIG. 4, when the first electrically conductive brush 120 exceeds a predetermined wear threshold, at least a portion of the wear arm 142 of the first wear indicator 122 extends beyond the first insert face 90 of the insert 64 making the wear arm 142 visible when the removable access panel disposed proximate the edge of the nacelle and an edge of the propeller spinner 14 is removed. The extension of at least a portion of the wear arm 142 of the first wear indicator 122 visually indicates to maintenance personnel that at least one of the brushes of the electrically conductive brush assembly 66 may need replacement.

The second electrically conductive brush 124 is slidably received within the second aperture 102. The second electrically conductive brush 124 extends from the insert 64 disposed in the brush block housing 60. The second electrically conductive brush 124 has a substantially similar configuration as the first electrically conductive brush 120 and includes a brush body that extends between a first brush end and a second brush end. The brush body slidably engages an interior surface of the second aperture 102. The first brush end is configured to engage the second slip ring 52 of the plurality of slip rings 34. The second brush end is disposed proximate the back wall 76 of the brush block housing 60 and is disposed proximate the second insert face 92 of the insert 64.

A second biasing member is received within the second aperture 102. The second biasing member engages the back wall 76 of the brush block housing 60 and engages the second brush end. The second biasing member biases the first brush end of the second electrically conductive brush towards engagement with the second slip ring 52 of the plurality of slip rings 34. As a wear surface of the second electrically conductive brush 124 wears, the second biasing member moves the second electrically conductive brush 124 outward from the brush block housing 60 towards the plurality of slips rings 34.

The third electrically conductive brush 126 is slidably received within the third aperture 104. The third electrically conductive brush 126 extends from the insert 64 disposed in the brush block housing 60. The third electrically conductive brush 126 has a substantially similar configuration as the second electrically conductive brush 124 and includes a brush body that extends between a first brush end and a second brush end. The brush body slidably engages an interior surface of the third aperture 104. The first brush end is configured to engage the third slip ring 54 of the plurality of slip rings 34. The second brush end is disposed proximate the back wall 76 of the brush block housing 60 and is disposed proximate the second insert face 92 of the insert 64.

A third biasing member is received within the third aperture 104. The third biasing member engages the back wall 76 of the brush block housing 60 and engages the second brush end 134. The third biasing member biases the first brush end of the second electrically conductive brush towards engagement with the third slip ring 54 of the plurality of slip rings 34. As a wear surface of the third electrically conductive brush 126 wears, the third biasing member moves the third electrically conductive brush 126 outward from the brush block housing 60 towards the plurality of slips rings 34.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A propeller assembly, comprising:
a propeller hub configured to rotatably support a propeller blade having a heating element;
a plurality of slip rings electrically connected to the heating element, the plurality of slip rings disposed on a spinner bulkhead attached to the propeller hub; and
a brush block assembly configured to engage the plurality of slip rings to transfer electric power from a power source to the heating element, the brush block assembly comprising:
a brush block housing that defines an opening configured to receive an insert having a first aperture that extends from a first insert face towards a second insert face, the first insert face is disposed proximate a front wall of the brush block housing;
a mounting bracket connected to the brush block housing and a reduction gearbox;
a first electrically conductive brush extending from the brush block housing and is configured to engage a slip ring of the plurality of slip rings, the first electrically conductive brush includes a brush body that extends between a first brush end and a second brush end; and
a first wear indicator having a base disposed about the second brush end and a wear arm extending from the base towards the first brush end.

2. The propeller assembly of claim 1 wherein the first aperture slidably receives the first electrically conductive brush provided with the first wear indicator.

3. The propeller assembly of claim 1, wherein the brush block assembly further comprising a first biasing member received within the first aperture.

4. The propeller assembly of claim 3, wherein the first biasing member engages a back wall of the brush block housing and at least one of the base of the first wear indicator and the second brush end to bias the first brush end towards engagement with the slip ring of the plurality of slip rings.

5. The propeller assembly of claim 4, wherein at least a portion of the wear arm extends beyond the first insert face when a wear condition of the first electrically conductive brush exceeds a wear threshold.

6. A brush wear indicating arrangement, comprising:
an insert disposed within a brush block housing, the insert defining a first aperture;
a first electrically conductive brush movably engages within the first aperture, the first electrically conductive brush includes a brush body that extends between a first brush end and a second brush end, the electrically conductive brush configured to move outward from the first aperture as a wear surface of the first electrically conductive brush wears; and
a wear indicator having a base disposed about the second brush end and a wear arm extending from the base towards the first brush end, the wear indicator configured to extend beyond a first insert face of the insert as wear condition of the wear surface of the first electrically conductive brush exceeds a wear threshold.

7. The brush wear indicating arrangement of claim 6, further comprising a first biasing member received within the first aperture that engages the second brush end to bias the first brush end towards a first slip ring of a plurality of slip rings.

8. The brush wear indicating arrangement of claim 7, wherein the first aperture includes a brush opening and an indicator opening extending from the brush opening.

9. The brush wear indicating arrangement of claim 8, wherein the brush opening has a brush opening width and the indicator has an indicator opening width that is less than the brush opening width.

10. The brush wear indicating arrangement of claim 9, wherein at least a portion of the wear arm extends beyond the first insert face when the wear condition of the first electrically conductive brush exceeds the wear threshold.

11. The brush wear indicating arrangement of claim 7, wherein the insert defines a second aperture extending from the first insert face towards a second insert face, the second aperture being spaced apart from the first aperture.

12. The brush wear indicating arrangement of claim 11, further comprising a second electrically conductive brush having a second brush body extending between a second brush first end and a second brush second end slidably received within the second aperture.

13. The brush wear indicating arrangement of claim 12, further comprising a second biasing member received within the second aperture that engages the second brush second end to bias the second brush first end towards engagement with a second slip ring of the plurality of slip rings.

14. The brush wear indicating arrangement of claim 6, wherein the base of the wear indicator is configured as a ring having an opening extending there through.

15. The brush wear indicating arrangement of claim 14, wherein an electrical wire extends from the second brush end through the opening.

* * * * *